Patented Oct. 8, 1940

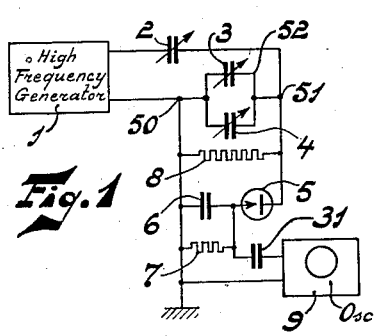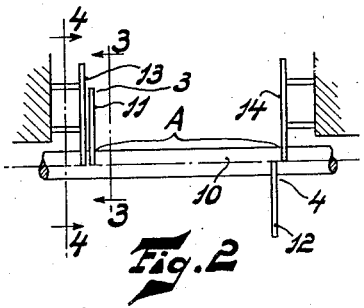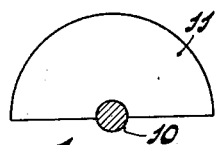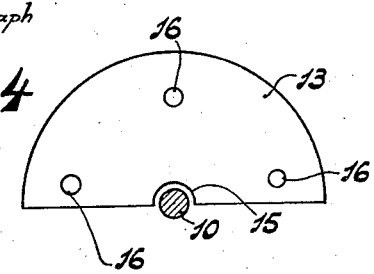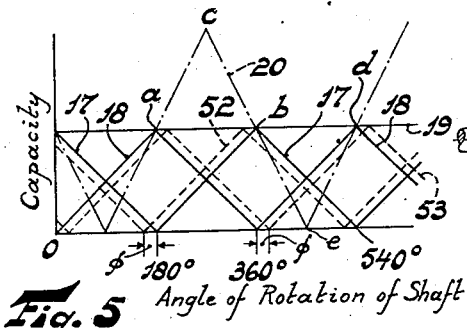

2,217,539

UNITED STATES PATENT OFFICE 2,217,539

TORSION METER

Sake Leendert de Bruin, Eindhoven, Netherlands, assignor, by mesne assignments, to Hartford National Bank and Trust Company, Hartford, Conn., as trustee Application June 27, 1938, Serial No. 216,104
In Germany July 22, 1937

11 Claims. (Cl. 265—25)

My invention relates to a device for measuring the angle of torque in rotary machine parts.

The main object of the invention is to produce a simple and accurate device for determining the angle of torque, or variations therein.

A further object of my invention is to provide a device which may be readily applied to the member to be tested.

A still further object is to provide a device which is not influenced by vibrations in the part being measured.

Further objects of the invention will appear as the description progresses.

According to the invention, I measure the angle of torque, or variations thereof, electrically by causing the relative displacement due to torsion to produce variations in capacity which influence a measuring or responding circuit.

More particularly, the device according to the invention comprises a condenser system consisting of two variable condensers connected to a measuring or responding circuit which comprises a source of current, and each having one armature driven without slippage by the rotary member in which the torque is to be measured. As long as the relative positions of these two movable armatures are the same, which is the case in a shaft which is stationary or rotates without torsion, the total capacity of the condenser system may depend, it is true, on the accidental position of the shaft, but varies at the most according to determined periodic function. However, a torsion in the shaft will be indicated by deviation of the capacity from the ordinary value during the rotation.

To make this deviation visible, I prefer to use an oscillograph by which it is possible to represent the capacity, which varies periodically during rotation, by a curve from which the capacity deviations caused by torsion can be easily ascertained. A cathode ray oscillograph is preferably used because of its high sensitiveness and the easy representation of the curve.

I preferably use condensers of the rotatory-plate type whose capacities vary linearly with the angle of rotation, because the measured variation in capacity will be in proportion to the angle of torque to be determined. This may be achieved in a simple manner by using for at least one of the armatures of the measuring condensers a semi-circular plate which is adapted to rotate about its centre, or by a plurality of such plates which are spaced by a constant axial distance from the other armature.

According to a further feature of the invention, the determination of the torsion diagram is considerably facilitated by connecting the two measuring condensers in parallel, and by so arranging and dimensioning them that, when the member to be tested rotates without torsion, their total capacity remains constant. For this purpose, the decrease in capacity of one of the condensers must at all times compensate the increase in the capacity of the other condenser. This is achieved in a very simple manner by using two similar condensers having semi-circular plates and a constant axial spacing between the plates, and by adjusting one condenser to the zero value when the other has its maximum capacity. However, when that portion of the member to be tested which is located between the condensers exhibits some torsion, one of the condensers will lag with respect to the other to produce a variation in the total capacity of the condenser system.

The use of condensers having one plate stationary with respect to the member is less desirable for measuring variations in the angle of torque because periodic variations of the capacity will be produced even with a constant angle of torque. In such cases, I prefer to mount the fixed plate or stator on an auxiliary member, for example a flywheel, which rotates without vibration with the portion of the member on which the corresponding movable plate or rotor is mounted. If there is no torsion on the member being measured, the capacity of each individual condenser will remain constant during the rotation. The variation in the capacity of both condensers may be indicated on a measuring instrument, and the angular rotation of each condenser rotor may be determined. The angle of torque to be determined is obtained from the difference between the angular rotations of both condenser rotors.

Also in this case it is possible to electrically connect the two condensers in parallel and to so arrange them that when the member to be tested rotates without torsion with respect to the auxiliary members, the capacity of one condenser increases and that of the other condenser decreases by equal amounts. Thus, the sum of the capacities of the condensers varies only when torsion occurs in the part being tested. With non-excessive torsion a slight retardation or acceleration of the part to be tested as a unit with respect to the rotating auxiliary members, has no influence on the total capacity which depends on the torsion in the member being tested, so that torsional vibrations can be ascertained at once.

In order that the invention may be clearly understood and readily carried into effect, I shall describe the same in more detail with reference to the accompanying drawing, in which, Figure 1 is a schematic circuit diagram of a device according to the invention.

Fig. 2 is a side view of a shaft with measuring condensers arranged thereon,

Fig. 3 is a sectional view along line 3—3 of Fig. 2,

Fig. 4 is a sectional view along line 4—4 of Fig. 2,

Figs. 5 and 6 are graphs illustrating the operation of the device of Figures 1 and 2, Fig. 7 is a side view of a device according to another embodiment of the invention, Fig. 8 is a side view of a device according to another embodiment, Fig. 9 is a graph illustrating the operation of the device of Fig. 8, and Fig. 10 is a view of the window of the oscillograph of Fig. 1.

The circuit arrangement illustrated in Figure 1 comprises a high-frequency generator 1 which produces a high-frequency voltage, for instance 160 volts at 100 kilocycles. The high-frequency voltage so produced is applied, through a control impedance 2, shown as a variable condenser, across the terminals 50 and 51 of a variable capacity system 52 consisting of two variable measuring condensers 3 and 4 connected in parallel, which, as will be explained later, are arranged on the member in which the torsion is to be measured.

Connected between terminals 50 and 51 and one pair of deflecting plates of a cathode ray oscillograph 9 is a detector device consisting of a rectifying tube 5, a fixed condenser 6, a leakage resistance 7, and a leakage resistance 8. Thus there exists across one pair of deflecting plates of the oscillograph, a D. C. voltage of variable value, or, if a condenser 31 is provided as shown, a low-frequency alternating voltage.

There is applied to the second pair of deflecting plates (not shown) of the oscillograph 9 in a manner known per se, a linear sawtooth voltage which varies in synchronism with the rotation of the member to be tested, or a voltage which varies sinusoidally with time and whose frequency corresponds to the number of revolutions of this member. As means for providing such voltages and the construction of the oscillograph itself are well known in the art, further illustration or description of the same is believed unnecessary.

As shown in Fig. 2, condensers 3 and 4 consist of two semi-circular plates 11—13, and 12—14 respectively. Plates 11 and 12 are fixedly mounted, for instance soldered, or clamped to a shaft 10—the torsion in the portion A of which is to be measured—whereas plates 13 and 14 are mounted stationary with respect to the shaft. The arrangement is such that condenser 3 has its highest capacity when the condenser 4 just has a zero capacity, i. e. the movable plates 12 and 14 are on opposite sides of the shaft 10 when the plates 11 and 13 are on the same side of the shaft. When shaft 10 rotates without torsion in portion A, the combined capacity of condensers 3 and 4 remains constant because the capacity of one will increase as much as the capacity of the other decreases.

As shown in Fig. 3, plate 11 is of semi-circular shape and is concentrically mounted on shaft 10, and as shown in Fig. 4, stationary plate 13 is located on one side of shaft 10 with its straight edge in a plane passing through the axis of the shaft. Stationary plate 13 is provided at its edge with a semi-circular notch 15 to insulate the plate from shaft 10. Plate 13 is also provided with three holes 16 which serve for supporting the plate.

Plates 12 and 14 of condenser 4 are similar in shape to plates 11 and 13 respectively, and are mounted in a similar manner except that plate 12 is so arranged relative to plate 11 that the capacity of each condenser is practically zero when the plate 11 or 12 has been turned away from the plate 13 or 14 respectively as shown in Fig. 2.

The shape of the movable condenser plates 11 and 12, as shown in Fig. 3, insures a capacity which depends linearly on the angle of rotation. From the zero value the capacity of each condenser increases linearly with the angle of rotation until the latter attains the value of 180°, and then, upon further rotation, the capacity decreases linearly until at the angle of rotation of 360° it is again equal to zero. The curve representing the capacity as a function of the angle of rotation, is consequently a sawtooth-shaped line consisting of straight portions of equal slope.

In Fig. 5 the ordinates represent the capacities of the condensers 3 and 4, and the abscissae represent the angle of rotation of plates 11 and 12 with reference to stationary plates 13 and 14; the condensers being in the zero position in Fig. 2. Thus the sawtooth-curves 17 and 18 represent the variation in capacity of condensers 3 and 4 respectively, and as long as there is no torsion in the portion A of the shaft 10, i. e. between the plates 11 and 12, the total capacity of condensers 3 and 4 remains constant, as indicated by straight line 19, which is the sum of curves 17 and 18.

If there is a relative displacement of plates 11 and 12, i. e., if there is torsion in portion A, the total capacity will vary; and will fluctuate between two values whose sum is constant, and the difference between these values becomes larger as the angle of torque increases. The dash-dot sawtooth-line 20 represents the highest fluctuation of the capacity, which occurs at an angle of torque of 180°. More particularly, if in Figure 2 plate 11 is rotated clockwise 90° and plate 12 is rotated counterclockwise 90° to produce the angle of torque of 180°, one half of the area of each of these plates will oppose the plates 13 and 14 respectively. This is the zero position for curve 20 and corresponds to a total capacity equal to the capacity of one of the two condensers. Between an angle of torque $\phi$ and the angle of torque 180°, one obtains a curve consisting of trapezoidal portions whose upright sides are always located on the line 20. The top of the triangle $a\ b\ c$ and the bottom of triangle $b\ d\ e$ are consequently cut-off, and the amount cut-off becomes smaller the more the angle of torque $\phi$ approaches 180°.

For example, if the angle of torque in portion A is constant and equal to a value $2\phi$ of about 45°, the curves 17 and 18 assume the positions of the dotted curves 52 and 53 respectively. The sum of the ordinates of curves 52 and 53 gives the curve 54 of Fig. 6, from which it appears that sum of the capacities of the condensers 3 and 4 varies between a maximum value $C_2$ and a minimum value $C_1$.

The angle of torque can be determined from the difference between the maximum value $C_2$ and the minimum value $C_1$ of the capacity, which values are read off on the oscillograph 9 of Fig. 1 which is provided with a suitable scale for this purpose.

The arrangement of Fig. 2 using fixed condenser plates is less suited for indicating torsional variations because, as is shown in Fig. 6, a fluctuating total capacity is produced even with a constant angle of torque, so that voltage variations are also applied to the measuring or responsive circuit. For determining variations in the angle of torque, I prefer to so mount the "fixed" plates of the variable condensers, i. e., plates 13 and 14 of Fig. 2, that each is actuated without any slip by an auxiliary member which rotates without vibration at the average velocity of rotation of the shaft.

This principle is illustrated by Fig. 7, in which plates 11 and 12 of condensers 23 and 24 respectively are mounted in the same manner as in Fig. 2, i. e. fixed to shaft 10. However, the stators or "fixed" plates 13 and 14 are fixedly secured to flywheels 25 and 26 respectively rotatable about the axis of shaft 10. The flywheels 25 and 26 are rotatably mounted upon shaft 10 and connected thereto by means of suitable elastic couplings diagrammatically indicated at 27 and 28, and are so designed that they are not influenced by the variations in the angle of torque to be measured. As such elastic couplings are well known in the art, further description of the same is believed to be unnecessary.

Also in this case it is advantageous to arrange the condensers in such manner that when shaft 10 rotates without torsion in portion A, the total of the capacities of condensers 23 and 24 remains constant. It is furthermore advantageous, as will be explained hereinafter, that both condensers should be adjusted to half their capacities.

When shaft 10 rotates as a unit over a small angle with respect to the flywheels 25 and 26, the capacity does not vary. If torsion takes place in portion A, the total capacity of the two condensers varies but does not oscillate between two values as is the case in Fig. 2, and remains constant when the angle of torque is constant.

This is illustrated diagrammatically in Fig. 9 in which the ordinates represent capacity and the abscissae represent relative angle of rotation of plates 11 and 12 with respect to plates 13 and 14. The capacities of condensers 23 and 24 are represented as functions of the relative rotation in the same direction, by the lines 27 and 28 respectively. It is assumed that the two condensers 23 and 24 have capacities which are equal and vary linearly with the relative angle of rotation. It is further assumed that the condensers are adjusted to half the capacity when in the neutral position, and that rotation in one direction has opposite influences on the capacities of the two condensers so that the capacity of one increases as much as the capacity of the other decreases. Such an arrangement is illustrated in Fig. 8 which is the same as Fig. 7 except that plates 11 and 12 are displaced 90°.

If the angle of torsion within portion A is equal to an angle $2\phi$ while the velocity of rotation in the center line of the shaft remains equal to that of the flywheels, the total capacity, which had an initial value $C_3$, changes to the value $C_4$. The new partial capacities of condensers 23 and 24 are designated by the dotted lines 29 and 30 respectively.

In other words if the shaft 10 rotates as a unit with respect to the flywheels the total capacity of the condensers has a constant value, whereas if torque occurs in portion A the total capacity changes to another value which indicates the angle of torque.

More particularly, when the velocity of the shaft is equal to that of the flywheels and there is no torque in the shaft, there will be merely a line showing along the time axis of the oscillograph, but when there is a change in the capacity of the condensers due to torque, there will be a line which is parallel to the axis but spaced therefrom and which gives an indication of the angle of torque.

This is shown in Fig. 10, which is a view of the oscillograph of Fig. 1, and shows the oscillographic picture obtained when the condensers 3 and 4 are replaced by the condensers 23 and 24, and when the sum of the capacities of these latter condensers have the values $C_3$ and $C_4$ as shown in Fig. 9. If the condenser 31 of Fig. 1 is omitted, there will be produced across the vertical plates of the oscillograph a high-frequency direct voltage whose mean value is proportional to the sum of the capacities of the two condensers. As a saw tooth voltage is applied to the horizontal plates of the oscillograph a horizontal line corresponding to the sum of the capacities of the two condensers will be produced on the oscillograph window. If the apparatus is adjusted by means of control condenser 2 so that the horizontal line produced when there is no torque coincides with the time axis, the distance between the time axis and the horizontal line produced when there is torque in the shaft will be a measure of the angle of this torque and can be read directly on a properly-calibrated scale. As shown in Fig. 10 the reference numeral 60 indicates the horizontal line which corresponds to the normal capacity ($C_3$) i. e. without torque, of condensers 23 and 24 and coincides with the time axis. The reference number 61 indicates the horizontal line corresponding to the total capacity ($C_4$) of the condenser when there is an angle of torque of $2\phi$ in portion A and the distance 62 is a measure of this angle of torque, the value of which in degrees can be obtained from a suitably-calibrated scale.

From the Figure 9 it appears that at an angle of torque $2\phi$, rotation of the shaft as a unit (of the shaft center) with respect to the flywheels does not influence the total capacity of the two condensers, and therefore the indication of the measurement, provided the angle of relative rotation of the flywheels with respect to the plates 11 and 12 (which in practice will be limited to a small angle) does not exceed the value $90°-\phi$, as measured from the mean position shown in Fig. 8. If, however, each of the condensers in their neutral position are not adjusted to half the capacity, as shown in Fig. 8, the said allowable relative angle of rotation of the flywheels decreases accordingly, and vibrations in the rotational velocity of the shaft more rapidly brings about a variation in capacity which may give rise to an erroneous reading.

I have found that satisfactory results may be obtained if the condensers 3 and 4, and 23 and 24, have a maximum capacity of about $10\mu\mu f$. as in this case an angle of torque of 1° gives a capacity variation of $0.5\mu\mu f$. When taking into account the capacities of the conductors used in the circuit arrangement, which amount say to $40\mu\mu f$, it can be calculated that with a high-frequency voltage of 80 volts at 100 kilocycles of the measuring condensers, one obtains at the measuring or responsive circuit a voltage variation of about 40 milli-volts for each degree of the angle of torque.

In the above example the condensers may consist of two plates, as shown in Figs. 2, 7 and 8, which are spaced apart a distance of about 0.2 cm. and whose operative semi-circular faces have an outside radius of about 3 cms.

In order to make it possible to work with a low voltage on the measuring condensers, the latter may be arranged in one of the branches of a high-frequency bridge-connection as described in my prior application Ser. No. 203,187, filed April 20, 1938 which matured into Patent No. 2,178,471 on Oct. 31, 1939. The latter should preferably not be adjusted to zero, but be slightly shifted with respect to the point of equilibrium in order to permit one to distinguish a positive angle of torque from a negative angle of torque.

What I claim is:

1. A device for determining torsion in a rotary member, comprising a variable condenser having an armature adapted to be driven without slip from one point of the member, a second variable condenser having an armature adapted to be driven without slip from a second point of the member, and electrical means for measuring the capacities of said condensers including a source of current, said means comprising a single measuring circuit including both of said condensers.

2. A device for determining torsion in a rotary member, comprising a variable condenser having an armature adapted to be driven without slip from one point of the member, a second variable condenser having an armature adapted to be driven without slip from a second point of the member, electrical means for measuring the capacities of said condensers including a source of current and an oscillograph, said means comprising a single measuring circuit including both of said condensers.

2. A device for determining torsion in a rotary member, comprising means to produce two capacities which vary with respect to each other with torsion in the shaft and each of which varies linearly with the angle of rotation of the member, said means comprising a variable condenser having an armature adapted to be driven without slip from one point of the member, a second variable condenser having an armature adapted to be driven without slip from a second point of the member, and electrical means for measuring the capacities of said condensers including a source of current.

4. A device for determining torsion in a rotary member, comprising a variable condenser having a semicircular armature adapted to be rotated about its center with the velocity of one point of the member, a second variable condenser having a semicircular armature adapted to be rotated about its center with the velocity of a second point of the member, and electrical means for measuring the capacities of said condensers including a source of current, said means comprising a single measuring circuit including both of said condensers.

5. A device for determining torsion in a rotary member, comprising means for producing a capacity which varies with the angle of torque between two points on said member and remains constant when the member rotates without torsion, said means comprising a variable condenser having an armature adapted to be driven without slip from one of said points, and a second variable condenser having an armature adapted to be driven without slip from the second point, and electrical means for measuring the sum of the capacities of said condenser comprising a source of current.

6. A device for determining torsion in a rotary member comprising, a variable condenser having one armature adapted to be fixed to said member at one point thereof, and a second armature, a second variable condenser having one armature adapted to be fixed to said member at a second point thereof, and a second armature, elastic means for connecting said second armatures to said member in the vicinity of said points to thereby cause the same to rotate without vibration, and electrical means for measuring the capacities of said condensers including a source of current, said means comprising a single measuring circuit including both of said condensers.

7. A device for determining torsion in a rotary member, comprising a variable condenser having one armature adapted to be fixed to said member at one point thereof, and a second armature, a second variable condenser having one armature adapted to be fixed to said member at a second point thereon, and a second armature, a resilient coupling for connecting each of said second armatures to said member, and electrical means for measuring the capacities of said condensers including a source of current.

8. A device for determining torsion in a rotary member, comprising a variable condenser having an armature adapted to be fixed to said shaft at one point thereof, a second variable condenser having an armature adapted to be fixed to said shaft at a second point thereon, and electrical means for measuring the capacities of said condensers including a high-frequency generator, said means comprising a single measuring circuit including both of said condensers.

9. A device for determining torsion in a rotary member comprising a variable condenser having one armature fixed to said shaft at one point thereof, and a stationary armature, a second variable condenser having one armature fixed to said shaft at a second point thereon, and a stationary plate, and electrical means including a source of current for measuring the capacities of said condensers, said means comprising a single measuring circuit including both of said condensers.

10. A device for determining torsion in a rotary member comprising a variable condenser having an armature adapted to be moved at a rotational velocity proportional to that of one point on the member, a second variable condenser having an armature adapted to be moved at a rotational velocity proportional to that of another point on the member, and electrical means for measuring the sum of the capacities of said condensers, said means comprising a source of high-frequency oscillations, a control impedance connected between said source and condensers, a measuring circuit including an oscillograph, and a detector device connected between said condensers and measuring circuit.

11. A device for determining torsion in a rotary member comprising a variable condenser having an armature adapted to be moved at a rotational velocity proportional to that of one point of said member, a second variable condenser having an armature adapted to be moved with a rotational velocity proportional to that of another point of said member, and electrical means for measuring the sum of the capacities of said condensers comprising a source of current, a bridge circuit having a branch including said condensers, and an indicating device.

SAKE LEENDERT DE BRUIN.

CERTIFICATE OF CORRECTION.

Patent No. 2,217,539. October 8, 1940.

SAKE LEENDERT de BRUIN.

It is hereby certified that error appears in the printed specification of the above numbered patent requiring correction as follows: Page 3, first column, line 75, after the article "the" at end of line insert --window of the--; page 4, first column, line 28, for the claim number "2" read --3--; and that the said Letters Patent should be read with this correction therein that the same may conform to the record of the case in the Patent Office.

Signed and sealed this 5th day of November, A. D. 1940.

(Seal)

Henry Van Arsdale,
Acting Commissioner of Patents.